Dec. 15, 1964     J. HALLER     3,161,445
SELF-ALIGNING SPHERICAL BEARING
Filed Sept. 28, 1962
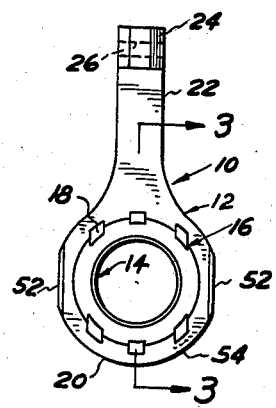
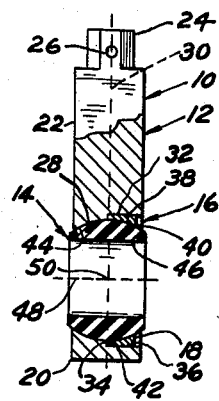
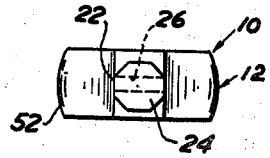
INVENTOR.
JOHN HALLER
BY Barthel & Bugbee
ATTORNEY United States Patent Office 3,161,445
Patented Dec. 15, 1964

3,161,445
SELF-ALIGNING SPHERICAL BEARING
John Haller, 18500 Sheldon Road, Northville, Mich.
Filed Sept. 28, 1962, Ser. No. 226,889
1 Claim. (Cl. 308—72)

This invention relates to bearings and, in particular, to self-aligning spherical bearings.

One object of this invention is to provide a self-aligning monoball spherical bearing wherein a bearing body, such as a rod end, is formed of sintered powdered material, such as sintered powdered metal, with the concave annular spherical bearing surface, in which is mounted an annular ball of bearing material, such as sintered powdered plastic material, and retained therein by an annular retainer or race, preferably also of sintered powdered metal, and secured in a recess or counterbore in the bearing body in any suitable way, as by staking, whereby a superior high precision self-aligning bearing is provided at a relatively low cost of manufacture.

Another object is to provide a self-aligning monoball spherical bearing of the foregoing character wherein permanent lubrication is provided for the bearing elements by charging the bearing body with lubricant held in the pores thereof and also preferably by incorporating in the ball itself a solid lubricant which, in cooperation with the oil or other lubricant derived from the body and retaining race, insures long life for the bearing and freedom from freezing or sticking during long continued or heavy duty operations.

Another object is to provide a self-aligning monoball spherical bearing of the foregoing character wherein the pressed and sintered plastic ball not only provides improved elasticity, impact resilience and damping of noise and vibration, but also assures smooth operation under the most severe conditions of vibration and changes of environment.

Other objects and advantages of the invention will become apparent during the course of the following description of the accompanying drawings, wherein:

FIGURE 1 is a front elevation of an improved self-aligning monoball spherical bearing, formed as a rod end bearing, according to one form of the inventon;

FIGURE 2 is a top plan view of the bearing shown in FIGURE 1; and

FIGURE 3 is a central vertical section with the upper portion in side elevation, through the bearing shown in FIGURE 1, taken along the line 3—3 in FIGURE 1.

Referring to the drawing in detail, FIGURES 1 and 3 show a self-aligning monoball spherical bearing, generally designated 10, according to one form of the invention as consisting generally of an outer bearing member or bearing body 12 in which is inserted an inner bearing member or annular bearing ball 14 held in place by an annular retaining race 16 which in turn is secured in position by staking indentations 18 (FIGURE 1). The bearing body 12 and retaining race 16 are preferably formed by pressing powdered metal, such as powdered iron, in a correspondingly-shaped mold in a conventional sintering press, and sintering the briquette upon its removal from the mold cavity, so as to produce the high strength sintered iron body capable of carrying about 15 percent to 20 percent oil by volume within its porous structure. The mold cavity for producing the bearing body 12 is correspondingly shaped to provide the annular head portion 20 with or without the shank 22 projecting radially therefrom and terminating in a hexagonal end portion 24 containing a transverse hole 26 in the event that the bearing 10 is desired for service as a rod end bearing.

During the pressing of the bearing body 12 in the mold, there is produced an annular bearing socket 28 with a surface of concave spherical curvature extending approximately to the central plane 30 of the bearing body 12, or approximately halfway therethrough (FIGURE 3). At the central plane 30, the socket 28 communicates with a counterbore or countersink 32 at a radial abutment shoulder 34. The retaining race 16 has an approximately cylindrical outer surface 36 mating with the approximately cylindrical counterbore 32, an inner concave spherical surface 38 forming a continuation of the spherical concave bearing surface 28 and of the same radius of curvature, and front and rear radial surfaces or edges 40 and 42 respectively. After pressing and sintering, the porous retaining race 16 is preferably subjected to a coining operation in order to form it to close dimensional tolerances.

The annular bearing ball 14 has an outer spherical surface 44 mating with the spherical surfaces 28 and 38 in the head portion 20 of the body 12, and a cylindrical through bore 46 coaxial with the axis 48 of the bearing ball 14. The concave spherical bearing surfaces 28 and 38, and the convex bearing surface 44 are all centered at the point 50 on the axis 48. In the event that the bearing 10 is a rod end bearing, the opposite sides 52 of the head portion 20 (FIGURE 1) may optionally be provided with cylindrical approximately parallel surfaces at 52 which are of longer radius of curvature than that of the periphery 54 of the head portion 20. The bearing ball 14 is preferably formed of the sintered powdered polyamide plastic known as nylon.

The bearing body 12 and retaining race 16 are then charged with oil or other suitable lubricant, so as to fill their pores with such lubricant. In one process of doing this, the porous components are placed in a closed tank or vessel containing the oil and immersed in that oil. The air within the tank or vessel is then evacuated by means of a vacuum pump connected to the space above the oil, thereby withdrawing the air from the pores of the sintered powdered metal parts at the same time that the air is withdrawn from the space above the oil. This action is facilitated by heating the oil within the tank or closed vessel.

The lubricant combined with the bearing ball 14, on the other hand, may comprise a solid lubricating material such as a heavy grease formed from a petroleum derivative, or may comprise graphite.

In the assembly of the components 12, 14 and 16 of the self-aligning spherical bearing 10, the convex spherical outer surface 44 of the bearing ball 14 is placed in engagement with the concave spherical surface 28 of the bearing body 12 as the ball 14 is inserted therein, after which the retaining race 16 is pushed into position within the counterbore 32 until its inner surface 42 engages the radial abutment shoulder 34, as shown in FIGURE 3; the staking is then carried out at 18, deforming the metal by indenting adjacent portions of the bearing body 12 and retaining race 16 at their junction constituting the counterbore 32.

What I claim is:

A self-aligning monoball spherical bearing comprising an outer bearing member of lubricant-charged porous sintered powdered metal containing an annular bearing socket with a spherically-curved concave inner surface and a substantially smooth-walled annular counterbore extending inward to said bearing socket, a through-bored inner bearing ball relatively rockably mounted in said bearing socket and having a spherically-curved convex outer surface mating with the spherically-curved concave inner surface of said bearing socket in substantial surface-to-surface engagement, an annular retaining race member having a substantially smooth outer surface seated snugly in said counterbore and having a spherically-curved concave inner surface disposed substantially concentric with the concave inner surface of said bearing socket and mating with the spherically-curved convex outer surface of said inner bearing ball in substantial surface-to-surface engagement, said counterbore having a transverse annular abutment shoulder at its junction with said bearing socket and said retaining race member having an inner edge engaging said abutment shoulder, and means for securing said retaining race member in said counterbore comprising indentations in said outer bearing member and said annular retaining race member forming deformations spanning the junction therebetween.

References Cited in the file of this patent

UNITED STATES PATENTS

| | | |
|---|---|---|
| 2,365,552 | Hill | Dec. 19, 1944 |
| 2,614,898 | Adams | Oct. 31, 1952 |
| 2,724,867 | Smith | Nov. 29, 1955 |
| 2,906,568 | Gray | Sept. 29, 1959 |
| 3,037,822 | Plummer | June 5, 1962 |
| 3,068,551 | Cobb | Dec. 18, 1962 |

FOREIGN PATENTS

| | | |
|---|---|---|
| 1,053,655 | France | Sept. 30, 1953 |
| 1,120,289 | Germany | Dec. 21, 1961 |